United States Patent [19]

Gasbjerg

[11] Patent Number: 4,893,554
[45] Date of Patent: Jan. 16, 1990

[54] APPARATUS FOR DISTRIBUTING CHEESE COAGULUM IN A VAT

[75] Inventor: Knud Gasbjerg, Silkeborg, Denmark

[73] Assignee: Gadan Maskinfabrik A/S, Them, Denmark

[21] Appl. No.: 249,872

[22] Filed: Sep. 21, 1988

[30] Foreign Application Priority Data

Sep. 21, 1987 [DK] Denmark .............................. 4930/87

[51] Int. Cl.⁴ ........................ A01J 19/00; A01J 25/00
[52] U.S. Cl. ........................................ 99/458; 99/462;
99/465; 222/200; 366/300; 366/301
[58] Field of Search ........................ 99/452, 457–459,
99/460–466, 348; 366/150, 182, 195, 196, 154,
155, 297, 300, 301; 222/196, 198, 200, 201, 342,
281; 141/78, 183

[56] References Cited

U.S. PATENT DOCUMENTS

| 2,447 | 2/1842 | Wilson et al. | 99/459 X |
| 2,283,008 | 5/1942 | Le Bar et al. | 366/301 X |
| 4,083,475 | 4/1978 | Venner et al. | 222/198 |
| 4,309,941 | 1/1982 | Brockwell | 99/466 |
| 4,363,341 | 12/1982 | Powell | 141/78 |
| 4,501,196 | 2/1985 | Loichinger et al. | 99/460 X |
| 4,584,934 | 4/1986 | De Fockert | 366/301 |
| 4,679,497 | 7/1987 | Tomatis | 99/455 |
| 4,715,722 | 12/1987 | Hergeth et al. | 366/154 |
| 4,758,095 | 7/1988 | Kanda et al. | 366/300 X |

Primary Examiner—Timothy F. Simone
Attorney, Agent, or Firm—Antonelli, Terry & Wands

[57] ABSTRACT

With the use of a distributor unit, which is reciprocable over and along an oblong prepressing vat for cheese production, it has already been proposed that a uniform distribution of the whey/coagulum mixture can be achieved by a horizontal wing rotors in a transverse distributor container, such rotor or rotors being rotated to lift the mixture up to an overflowing edge of the container while isolating the mixture from the turbulent mixture receiving area of the container. However, it is experienced that coagulum lumps may build up on the overflowing edge and thus disturb an even overflow. To avoid this problem two interengaging wing rotors are mounted at the bottom of the container so as to sluice down the mixture along opposite, correspondingly arched bottom/side portions to a central lowermost outlet slot, whereby the risk of lump formations is practically eliminted without compromising the desired uniform distribution of the coagulum.

4 Claims, 1 Drawing Sheet

APPARATUS FOR DISTRIBUTING CHEESE COAGULUM IN A VAT

BACKGROUND OF THE INVENTION

The present invention relates to an apparatus for supplying cheese coagulum to an oblong prepressing vat or a similar container, comprising a distributor unit arranged generally crosswise of the longitudinal direction of the container and being reciprocable along the container, with the distributor unit being operable to receive a mixture of whey and cheese coagulum at one or more places along the length of the unit and, via an associated distributor container, to distribute this mixture over the length of the distributor unit in such a manner that the mixture may flow off from the distributor container in a broad, relatively even flow all over the length of the distributor container, which container is equipped with rotating wing rollers for sluicing out the mixture from the receiving place or places to and beyond elongated outlet edge means of the container.

What is endeavoured hereby, is to effect a highly uniform distribution or depositing of the cheese coagulum in the vat, throughout the area thereof, such that it is ensured that the coagulum is laid out with an even thickness, which, later on in the cheese production process, will result in the production of cheese members of equal thickness as required for a still later cutting off of cheese slices of a well defined width. This requirement is pronounced in commercial practice, particularly for the cheeses delivered to restaurants and cheese slice packing enterprises.

The reciprocation movement of the distributor unit along the prepressing vat will serve to ensure an even distribution of the coagulum mixture along the length of the vat, particularly as towards the end of the vat filling process the coagulum contents of the mixture will gradually decrease, when the mixture is delivered from a conventional curdling tank. However, the desired result will not be obtained unless the coagulum distribution is uniform also in the cross direction of the vat, i.e. in the length direction of the distributor unit.

It is difficult to obtain a uniform distribution of the coagulum in that direction, already because the coagulum, which is only slightly heavier than the whey, can move around in the whey in an uncontrolled manner, particularly by turbulence created at the place or places where the mixture is supplied to the distributor.

A principally good solution to this problem has been found to be the use of the wing rollers, which operate to lift the mixture up along a correspondingly arched wall portion of the distributor container from a bottom inlet area to a horizontal overflow edge thereof, whereby the mixture will be trapped temporarily between the consecutive pairs of wings and thus be shielded off from the turbulent mixture adjacent the container bottom before the trapped mixture is lifted over the overflow edge; in this manner the coagulum in the trapped or isolated mixture portions as extending all the way along the distributor container will get the opportunity to fall to rest before being delivered to the vat, and hereby the coagulum tends to distribute itself evenly along the container.

It has then been found, however, that by the passage of coagulum lumps over the overflow edge a build-up of such lumps may occur on the edge itself, whereby the free overflow may be locally obstructed, resulting in groove formations in the laid out coagulum layer in the vat.

It is the purpose of the present invention to provide a distributor apparatus of the type referred to, by which a flow obstructing lump build-up will be practically impossible and according to the invention this is achieved by constructing The apparatus such that wing rollers are mounted so as to engage with each other at an intermediate height level of the distributor container such as, for example, between an upper mixture receiving part of the container and a lower, slot-shaped bottom outlet thereof. The wing rollers are rotatable for sluicing down the mixture along respective opposed part-cylindrical bottom wall portions of the container to a common outlet space or chamber just above the slot-shaped bottom outlet.

Accordingly, the invention departs from the principle of bringing the mixture to an overflow edge, as instead of this it is let out through a bottom outlet slot with a flow intensity determined by the operation speed of the wing rollers; these, still acting to successively trap the mixture portions for a good coagulum distribution therein, will guide the mixture downwardly and inwardly to a delivery space just above the outlet slot, from which the mixture may then fall freely down into the vat. The wings will sweep along the arched container bottom almost entirely down to the respective opposed edges of the outlet slot, such that there will be no area in which the coagulum gets an opportunity to be supported on an underlying surface such as an overflow edge.

In the following the invention is described in more detail with reference to the accompanying drawing.

DETAILED DESCRIPTION

Figure 1:
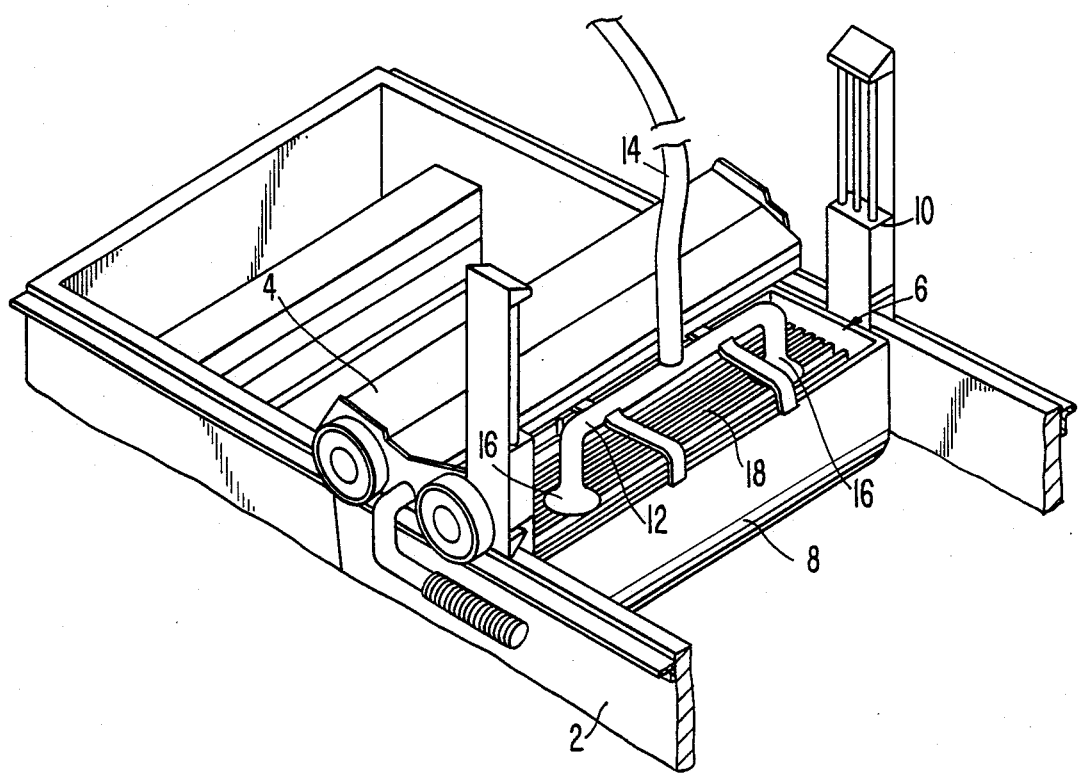
FIG. 1 is a perspective view of a prepressing vat provided with a distributor apparatus according to the invention.

As shown in FIG. 1, a prepressing vat 2 for cheese production is oblong and has a transverse cart 4 rested on its longitudinal side edges. The cart 4, which is operable to reciprocate by drive means (not shown); in the longitudinal direction of the vat, carries a distributor unit 6 comprising an elongated distributor container 8. The distributor unit 6 is arranged so as to be height adjustable by, for example, cylinder means (not shown) provided in a carrier system 10.

Figure 2:
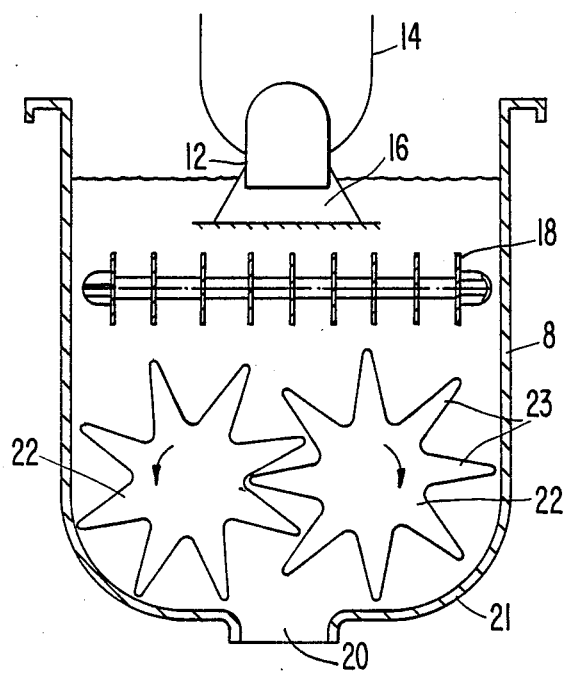
FIG. 2 is a cross sectional view of the distributor.

Above the distributor container 8 is arranged a supply tube 12, which receives a whey/coagulum mixture from a hose 14 and distributes the mixture to the container 8 through two mutually spaced outlets 16 shaped as diffusors, which will normally be more or less submerged in the distributor whey liquid in the container 8, as shown in FIG. 2. Underneath the level of the outlets 16, the distributor container 8 is provided with a horizontally disposed grating 18 including longitudinally extending, upright plate strips, which will disintegrate or keep back larger coagulum lumps supplied with the mixture.

As shown in FIG. 2 the distributor container 8 is provided with a slot shaped bottom outlet opening 20 and with rounded lower corner portions 21, these cooperating with a pair of opposed wing rotors 22 inside the distributor container 8. The wings 23 of two rotors 22 engage each other in the central area, while in the outer areas they sweep closely along the respective rounded corner portions 21 of the distributor container 8, the rotors being rotated in opposite directions as shown by arrows by drive means (not shown).

It will be noted that the tips of the rotor wings 23 will sweep along the bottom of the distributor container 8 practically all the way to the respective edge areas of the outlet slot 20, while in the central area the interengaging wings 23 are moved upwardly so that here no substantial downlet of the mixture can occur. There is no requirement as to a complete sealing between the wings 23 in the central area, since a limited fall down of the mixture at this place will be fully acceptable.

It will be appreciated that coagulum lumps happening to proceed to the area of the outlet slot 20 will have very poor chances of being deposited anywhere. The material is almost swept inwardly over the edges of the slot area 20 and is thereby passed to a free fall down area with no horizontal support surface portions. During the transportation of the mixture in the pockets between the wings 23 the mixture still gets time to fall to rest before its delivery to the outlet slot 20 such that by this delivery it has been effectively separated from the turbulences in the top portion of the container 8 for promoting a uniform distribution of the coagulum throughout the length of the distributor container 8.

Underneath the outlet slot 20 may be arranged a strainer for separating the coagulum from the whey if it is desired to deposit the coagulum in a 'dry' condition in the vat 2, as required for certain types of cheese. Particularly in that case the distributor unit 6 should not desirably be height adjustable in the vat otherwise provided for by means of the carrier structures 10.

It is characteristic for the invention that the mixture is supplied to the top of the distributor container 8, and it is advantageous that there is a large container volume above the wing rotors 22, as the wet mixture will then get better opportunities to be distributed uniformly in the longitudinal direction of the distributor container 8.

I claim:

1. An apparatus for supplying cheese coagulum to an oblong prepressing vat or similar container, the apparatus comprising a distributor means arranged generally crosswise of a longitudinal direction of the container and being reciprocable along a length of the container, the distributor means including a distributor container having opposed part-cylindrical bottom wall portions, an upper receiving portion, an elongated outlet edge means, and a slot-shaped bottom outlet means, said distributor means being operable to receive a mixture of whey and cheese coagulum from at least one location along a length of the distributor means and to distribute said mixture through the distributor container over the length of the distributor means in such a manner that the mixture may flow off from the distributor container in a broad relatively even flow over a length of the distributor container, rotating wing rollers provided in the distributor for sluicing out said mixture from the at least one receiving location to and beyond the elongated outlet edge means of the distributor container, said wing rollers are mounted so as to engage with each other at an intermediate height level of the distributor container, and wherein said wing rollers are rotatable for sluicing down the mixture along the respective part-cylindrical bottom wall portions of the distributor container just above said slot-shaped bottom outlet means.

2. An apparatus according to claim 1, wherein at least one mixture supply means is arranged at an upper portion of the distributor container, and wherein a horizontal grating means for disintegrating or holding back lumps of cheese coagulum as supplied with the mixture is arranged between the upper portion of the distributor container and a top level of the ring rollers.

3. An apparatus according to claim 2, wherein the wing rollers are arranged between the upper portion of the distributor container and the slot-shaped bottom outlet means located at a bottom of the distributor container.

4. An apparatus according to claim 3, wherein the distributor container includes a common outlet space means or chamber means in communication with the slot-shaped bottom outlet means for receiving the sluiced down mixture.

* * * * *